US 6,710,790 B1

(12) United States Patent
Fagioli

(10) Patent No.: US 6,710,790 B1
(45) Date of Patent: Mar. 23, 2004

(54) METHODS AND APPARATUS FOR TRACKING THE ACTIVE WINDOW OF A HOST COMPUTER IN A REMOTE COMPUTER DISPLAY WINDOW

(75) Inventor: James O. Fagioli, Holtsville, NY (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/134,076

(22) Filed: Aug. 13, 1998

(51) Int. Cl.⁷ .................................................. G09G 5/00
(52) U.S. Cl. ....................... 345/802; 345/778; 345/796
(58) Field of Search ................................. 345/778, 764, 345/785, 784, 796, 802, 751, 753, 759, 740; 709/204–205

(56) References Cited

U.S. PATENT DOCUMENTS

| 4,974,173 A |   | 11/1990 | Stefik et al. ............. 345/751 |
| 5,309,555 A |   | 5/1994 | Akins et al. ............. 345/756 |
| 5,463,726 A | * | 10/1995 | Price ....................... 345/797 |
| 5,564,002 A | * | 10/1996 | Brown ...................... 345/778 |
| 5,726,687 A | * | 3/1998 | Belfiore et al. ........... 345/684 |
| 5,742,285 A | * | 4/1998 | Ueda ........................ 345/778 |
| 5,841,435 A | * | 11/1998 | Dauerer et al. ............ 345/764 |
| 5,874,936 A | * | 2/1999 | Berstis et al. ............. 345/785 |
| 5,874,960 A | * | 2/1999 | Mairs et al. ............... 345/2.2 |
| 5,938,724 A | * | 8/1999 | Pommier et al. ........... 345/751 |
| 6,016,110 A | * | 1/2000 | Takinami ................... 340/995 |

FOREIGN PATENT DOCUMENTS

| EP | 0 469 923 A2 | 8/1991 |
| EP | 0 475 581 A2 | 8/1991 |
| FR | 2 744 551 A1 | 2/1996 |
| GB | 2 296 114 A | 6/1996 |
| WO | WO 99/63430 | 12/1999 |

OTHER PUBLICATIONS

"Symantec—The Norton PCAnywhere", *Symantec Corporation*, 1994, pp. 1–310.
IBM Technical Disclosure Bulletin, "Clipping of a Remote Pointer," vol. 35, No. 3, Aug. 1992, pp. 258–260.

* cited by examiner

*Primary Examiner*—Sy D. Luu
(74) *Attorney, Agent, or Firm*—Fliesler Dubb Meyer & Lovejoy LLP

(57) ABSTRACT

A remote application on a remote computer interacts with a host application on a host computer so as to present in a remote application display window of the remote computer display a portion of the host computer screen image which intersects the foreground window of the host computer. In the preferred embodiment, a position of a moveable viewport rectangle is calculated so as to center the image of the host active window within the remote application display window if the active window rectangle's dimensions are less than the moveable viewport rectangle's dimensions; if the moveable viewport rectangle's dimensions are less than the active window rectangle's dimensions, then the new position of the moveable viewport rectangle is calculated so as to left and/or top align the moveable viewport rectangle and the active window rectangle.

15 Claims, 14 Drawing Sheets

METHODS AND APPARATUS FOR TRACKING THE ACTIVE WINDOW OF A HOST COMPUTER IN A REMOTE COMPUTER DISPLAY WINDOW

BACKGROUND OF THE INVENTION

1. Field of the Invention

The present invention pertains to the field of controlling a host computer from a remote computer, and more particularly to host and remote computers running an operating system that uses windows for various applications and utilities. Specifically, the present invention relates to remote control of a host computer where the display viewport of the remote computer display used for the remote application to display a duplicate of the host screen image is less than the display area of the host display.

2. Discussion of the Related Art

In IBM compatible personal computers which run the Windows operating system, Symantec Corporation has developed a program called pcAnywhere for allowing remote access of a host computer from a remote computer. For example, a user's office personal computer may have network connections, files, programs, and other capabilities which the user may want to access when the user is away from his office in which his office personal computer is located. To allow remote access using the pcAnywhere program, the user starts the pcAnywhere host application on his office (host) computer and leaves the host computer running. The host computer may be secured from unauthorized use by a passworded screen saver or other utility.

When the user desires to access the host computer from a remote computer, he dials in or connects by some other means to the host computer from a remote computer using the pcAnywhere remote application. With the increasing popularity of hand-held Windows CE computers as the remote computer, it is often not possible to duplicate the entire host computer screen image on the remote computer. The pcAnywhere remote application provides the remote user with the ability to scroll around on the host computer display. However, frequently it is not evident to a remote user to which portion of the host computer display he should pan to find the active window of the remote computer.

This phenomenon is exceptionally problematic in the context of applications running on the host computer which spawn temporary new windows requiring some user input in order to continue any activity on the host machine. For example, the remote user might be using a word processing application running in a display window on the host computer, and upon attempting to save a file within the word processing program, the word processing application might spawn a small window which would pop up in an area of the host computer display not shown on the small remote display, so that the remote user viewing the host computer display screen image through the pcAnywhere remote application display window of the remote computer would not be able to see the spawned window that required input in order to continue.

For example, if the word processing application upon being directed to save a file pops up a window that says "file already exists, replace existing file with this file?" and includes yes and no buttons within the small window, then unless the small pop-up window is viewable within the pcAnywhere remote application display window of the remote computer, then the remote user may inaccurately view his system as being frozen. The remote user will not see the pop-up window of the host computer through the remote application display window, and therefore will not be able to provide the yes/no response to the pop-up window, and therefore will not be able to continue using the word processing application running on the host computer. Moreover, the remote user will not necessarily even know that the pop-up window has appeared on the host computer. The remote user will merely observe that no input into the regions of the host computer displayed on his remote display is possible, and therefore may erroneously conclude that his system has crashed.

As is apparent from the above discussion, a need exists for a method which would automatically focus or pan the remote application display screen image upon the portion of the host computer which is currently active and requiring input.

SUMMARY OF THE INVENTION

When the viewport of a remote application display window on a remote computer for remote access of a host computer is smaller than the host computer display, only a portion of the host computer screen image can be displayed on the remote application display window. If the active window of the host computer is not visible in the remote application display window, then the remote user is unable to see the active window of the host computer and may believe that the host computer is frozen, or will not be able to easily understand what is happening on the host computer. Therefore, an object of the present invention is to provide a method by which the viewport which determines which portion of the host computer display image is reproduced within the remote application display window can automatically be adjusted so as to display the portion of the host computer display image which includes the currently active host window. Another object of the present invention is to accomplish these adjustments to the contents of the remote application display window in a manner which is visually pleasing and understandable to the remote user.

According to the present invention, a remote application on a remote computer interacts with a host application on a host computer so as to present in a remote application display window of the remote computer display a portion of the host computer screen image which intersects the foreground window of the host computer. According to the present invention, a method performed by a remote application on a remote computer involves receiving a new active window message specifying an active window rectangle from the host application on the host computer, determining whether or not the moveable viewport rectangle (which defines the portion of the host computer display image to be displayed in the remote application display window of the remote computer display) intersects the active window rectangle, and moving the moveable viewport rectangle so as to intersect the active window rectangle if necessary.

In the preferred embodiment of the present invention, the new position of the moveable viewport rectangle is calculated so as to center the image of the host active window within the remote application display window if the active window rectangle's dimensions are less than the moveable viewport rectangle's dimensions; if the moveable viewport rectangle's dimensions are less than the active window rectangle's dimensions, then the new position of the moveable viewport rectangle is calculated so as to left and/or top align the moveable viewport rectangle and the active window rectangle.

According to another aspect of the preferred embodiment of the present invention, the moveable viewport rectangle is smoothly scrolled from its old position to its new position by accelerating the movement of the moveable viewport rectangle during the first half of the scroll, and decelerating the movement of the moveable viewport rectangle during the second half of the scroll. Because the scrolling operating takes a not insignificant amount of real time (on the order of one second), it is possible for one or more additional new active window messages to be sent from the host application to the remote application while a smooth scroll operation is in progress. Therefore, according to the preferred embodiment, the new active window messages are stored by the remote application in a first-in-first-out buffer upon receipt from the host application. The remote application retrieves the oldest new active window message from the first-in-first-out buffer for processing after completing a smooth scroll operation.

According to another aspect of the present invention, the host application on the host computer receives notification of a new foreground window from the host operating system by receiving a new foreground window message from the host operating system. The host application packages the information contained in the new foreground message to create a new active window message for the remote application. The new active window message created by the host application includes an active window rectangle specified by the pixel coordinates of its upper-left and lower-right corners.

These and other features, aspects, and advantages of the present invention will be apparent from the Detailed Description of the Invention which discusses the Figures, in which like parts are referred to with like reference numerals.

BRIEF DESCRIPTION OF THE DRAWINGS

The Figures are more fully explained in the Detailed Description of the Invention, in which like parts are designated by like reference numerals.

DETAILED DESCRIPTION OF THE INVENTION

When the viewport of a remote application display window on a remote computer for remote access of a host computer is smaller than the host computer display, only a portion of the host computer screen image can be displayed on the remote application display window. If the active window of the host computer is not visible in the remote application display window, then the remote user is unable to see the active window of the host computer and may believe that the host computer is frozen, or will not be able to easily understand what is happening on the host computer. According to the present invention, a method by which the viewport which determines which portion of the host computer display image is reproduced within the remote application display window can automatically be adjusted so as to display the portion of the host computer display image which includes the currently active host window. In addition, these adjustments to the contents of the remote application display window are accomplished in a manner which is visually pleasing and understandable to the remote user.

Figure 1:
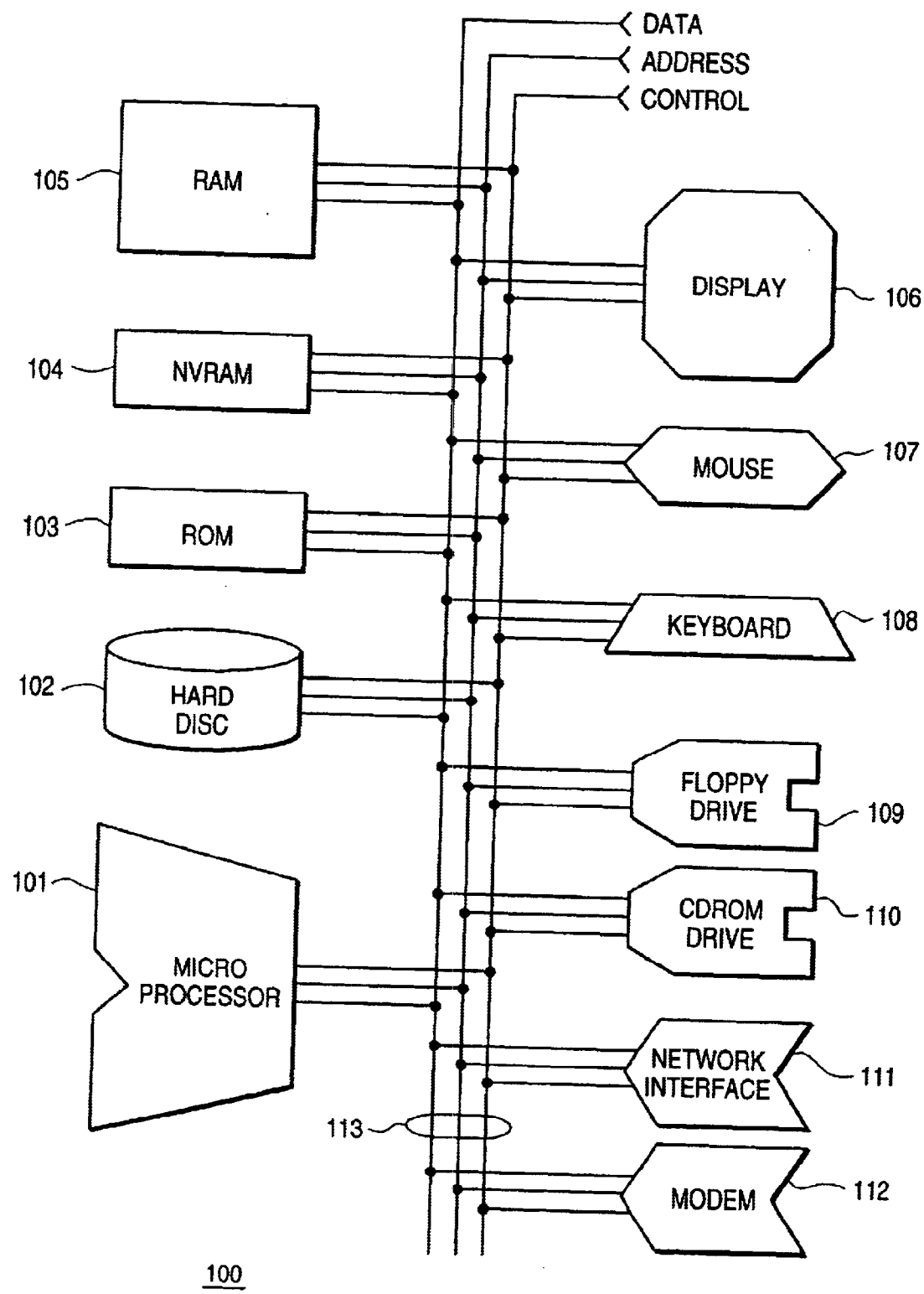
FIG. 1 illustrates a general purpose computer architecture suitable for running a remote or host application allowing remote access of a host computer with host active window tracking on the remote computer according to the present invention.

FIG. 1 illustrates a general purpose computer architectures 100 suitable for running a remote or host application allowing remote access of a host computer with host active window tracking on the remote computer according to the present invention. The general purpose computer 100 includes at least a microprocessor 101, Random Access Memory (RAM) 105, a display 106, and either a network interface 111 or a modem 112. The general purpose computer 100 may also include a hard disk 102, Read-Only Memory (ROM) 103, and Non-Volatile Random Access Memory (NVRAM) 104. The hard disk 102, ROM 103, and NVRAM 104 provide permanent storage capability for various purposes on the general purpose computer 100. The general purpose computer 100 additionally also includes user input devices such as a mouse 107 and keyboard 108. As additional data input facilities, the general purpose computer 100 may include a floppy drive 109 and a CD ROM drive 110. In order to communicate with other computing devices, the general purpose computer 100 must include either a network interface 111 or a modem 112 or both. As illustrated in FIG. 1, all of these elements are connected to a common data bus 113 having data, address, and control data paths.

Although the general purpose computer 100 illustrated in FIG. 1 includes only a single data bus 113, there is no requirement that this be the case. For example, the microprocessor 101 may alternatively be connected to multiple data buses which interface various subsets of the general purpose computer elements to each other. For example, the microprocessor 101, RAM 105, and NVRAM 104 may be connected by a single data bus; while the ROM 103 and hard disk 102 are connected to a second data bus that also interfaces with the microprocessor 101 indirectly. Similarly, the CD ROM drive 110, network interface 111, modem 112, floppy drive 109, mouse 107, and keyboard 108 may also be connected to each other via a third data bus which is indirectly connected to the microprocessor 101. Similarly, the display 106 may be connected to the microprocessor 101 indirectly through a separate data bus. As described above, it is to be understood that the general purpose computer 100 suitable for implementing the methods according to the present invention may take a variety of forms.

Figure 2:
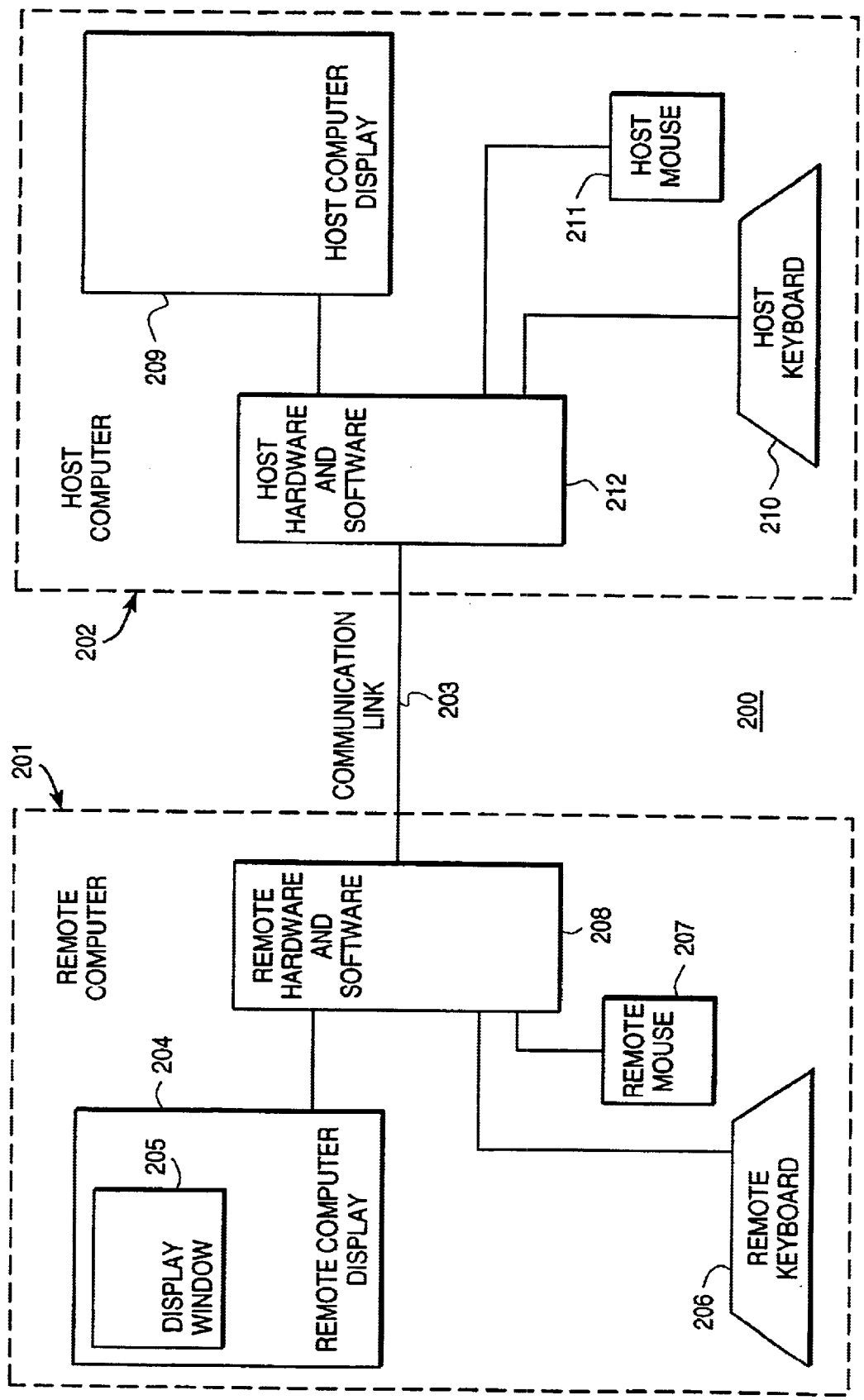
FIG. 2 illustrates a host computer and a remote computer suitable for performing remote access of the host computer, suitable for displaying a portion of the host computer screen image in the display window of the remote computer, and suitable for tracking the host active window in the display window of the remote computer according to the present invention.

FIG. 2 illustrates a host computer and a remote computer suitable for performing remote access of the host computer, suitable for displaying a portion of the host computer screen image in the display window of the remote computer, and suitable for tracking the host active window in the display window of the remote computer according to the present invention. The remote computer 201 consists primarily of a remote computer display 204, a remote keyboard 206, a remote mouse 207, and the remote hardware and software unit 208. The remote hardware and software unit 208 includes all of the CD ROM drives, floppy drives, network connections, modems, and most of the internal hardware necessary to run a computer, as is typical with modern personal computers. The remote hardware and software 208 also includes an operating system and application software.

Within the remote computer display 204 of the remote computer 201, a display window 205 corresponds to a remote application according to the present invention which is described below. The remote computer 201 interacts with a host computer 202 via a communication link 203. The communication link 203 may be implemented in a variety of methods, such as a TCP/IP connection, a direct modem-to-modem connection, or various other standard communication protocols and devices that are known in the art. The host computer 202 includes a host computer display 209, a host keyboard 210, a host mouse 211, and a host hardware and software unit 212. The host hardware and software unit 212 includes the various CD ROM drives and floppy drives and microprocessors, RAM, and other components necessary to implement a personal computer. The host hardware and software 212 also includes a host operating system and a host application, which will be discussed later.

Figure 3:
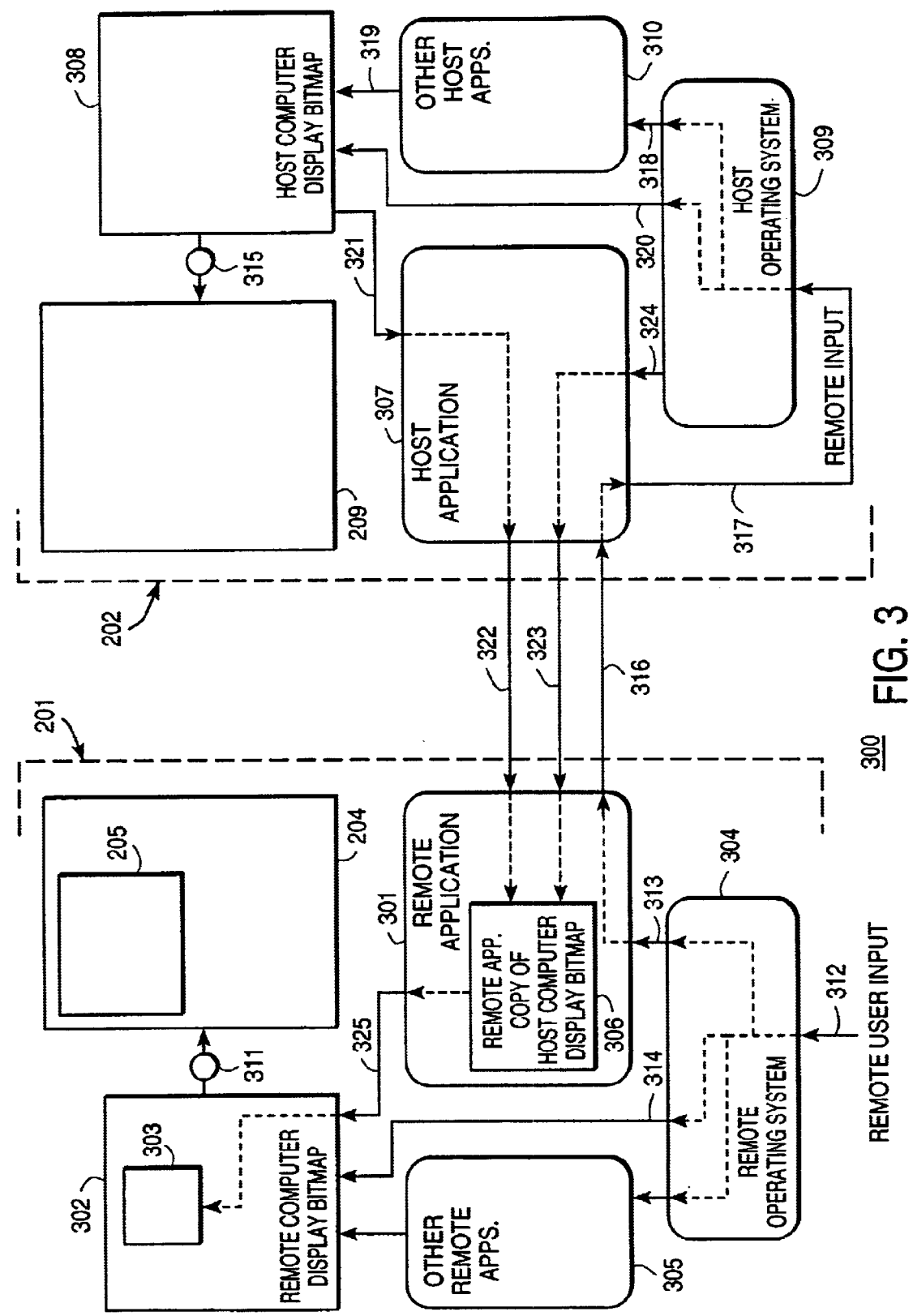
FIG. 3 is a logical depiction of a host computer system and a remote computer system suitable for performing remote access of the host computer, suitable for displaying a portion of the host computer screen image in the display window of the remote computer, and suitable for tracking the host active window in the display window of the remote computer according to the present invention.

FIG. 3 is a logical depiction of a host computer system and remote computer system suitable for performing remote access of the host computer, suitable for displaying a portion of the host computer screen image in the display window of the remote computer, and suitable for tracking the host active window in the display window of the remote computer according to the present invention. FIG. 3 shows the primary components necessary for practicing the present invention. Specifically, the remote computer display 204 displays a remote computer screen image which is contained in digital form in the remote computer display bitmap 302. The remote computer display bitmap 302 typically resides in RAM 105 and is read by a display driver (not shown) so that the contents of the remote computer display bitmap 302 are portrayed as a screen image on the remote computer display 204.

The remote computer display bitmap 302 includes a portion 303 which corresponds to the display window 205. The display window 205 corresponds to the remote application 301. In other words, the remote application 301 appears to the user through a display window 205. Therefore, the remote application 301 typically writes into the remote computer display bitmap 302 only in the section 303 of the remote computer display bitmap which corresponds to its display window 205. The display driver 311 is responsible for reading out the contents of the remote computer display bitmap 302 portraying the remote computer screen image 204 which includes the remote application display window 205.

The remote computer also typically includes other remote applications 305 which are responsible for writing various portions of the remote computer display bitmap 302 which will ultimately be displayed as other application windows in the remote computer display 204. The remote computer also includes a remote operating system 304, which interfaces with the remote application 301 and the other application 305, as well as with the remote computer display bitmap 302. The remote operating system receives user input 312 through a mouse 207 or keyboard 206, or other input device, and determines how to act on the remote user input 312. For example, if the mouse cursor is in a region of the remote computer display 204, which corresponds to the remote application 301 (if the mouse cursor is within remote application display window 205), and the user clicks the mouse 207, then the mouse click event is handed down to the remote application 301 by the operating system 304, through the link 313 illustrated in FIG. 3. Alternatively, if the mouse click occurs outside of any application window of the remote computer display 204, then the remote operating system 304 may update the remote computer display bitmap 302 directly through the link 314, if such updating is appropriate. Finally, other applications 305 will receive mouse input from the remote operating system 304 if the mouse appears in the display windows corresponding to the other remote applications when the mouse click event occurs. If appropriate, the other remote applications will update portions of the remote computer display bitmap which correspond to their respective display windows.

Similarly, the host computer includes a host computer display 209 and a host computer display bitmap 308, which digitally represents the host computer screen image to be displayed on the host computer display 209. The host computer graphics driver 315 is responsible for reading out of the host computer display bitmap 308 and displaying it as a host computer screen image on the host computer display 209. The host computer also includes a host operating system 309 and a host application 307.

In the system for providing remote access to a host computer according to the present invention, the remote user places the mouse cursor in the remote mouse 207 in the display window 205 corresponding to the remote application 301. By selecting the display window 205 corresponding to the remote application 301, the remote operating system 304 designates the remote application 301 as the foreground window which receives keyboard input from the remote keyboard 206. As long as the display window 205 corresponding with the remote application 301 is selected as the foreground window of the remote computer 201, remote user input 312 is channeled to the remote application 301 through the link 313 to be processed by the remote application 301.

The remote user input channeled to the remote application 301 through the link 313 is processed as described below. Because the system according to the present invention allows remote access of the host computer, the input 313 to the remote application is packaged by the remote application 301 and communicated to the host application 307 running on the host computer 202 through the communication link 316.

The host application 307 receives the messages from the remote application through the communication link 316 and delivers that input to the host operating system 309 through the link 317. In other words, the host application 307 directs the user input from the remote application 301 coming in on link 316 to the host operating system 309 as if the input 317 were host user input. Thus, the remote user input 312 having been processed by the remote operating system 304, the remote application 301, and the host application 307, is presented to the host operating system 309 as if it were coming directly from a host user. In this way, the remote user input 312 is delivered to the host computer 202 into the host operating system 309 in exactly the same manner as if a host user had been sitting at the host computer and performed the operations which were performed by the remote user through the remote user input 312.

Similarly to the way remote user input 312 is processed by remote operating system 304 for any of the applications running on the remote computer 201, the remote input 317 to the host computer 202 is processed by the host operating system 309 in an identical manner for all the applications running on the host computer 202. Specifically, if the remote input 317 corresponds to a host application 310, then the remote input 317 is delivered to the host application through link 318, thereby causing some activity to occur in the application 310, which might involve redrawing the portion of the host computer display bitmap 308, which corresponds to the application 310. Thus, the application 310 writes into the host computer display bitmap through link 319 into the portion of the host computer display bitmap 308 which corresponds to the display window of the application 310. Alternatively, if the remote input 317 is directed to the host operating system, rather than an application on the host computer 202, then the host operating system 309 may update the host computer display bitmap 308 directly through the link 320, if appropriate.

The host application 307 is capable of reading the host computer display bitmap 308 through the link 321. The host application 307 delivers messages to the remote application 301 through the link 322 so as to keep the remote application copy of the host computer display bitmap 306 as current and accurate as possible. In other words, the host computer display bitmap 308 is reproduced within the remote application 301 as the remote application copy of the host computer display bitmap 306. As a practical matter, the host application 307 must detect changes in the host computer display bitmap 308 in order to generate messages for the remote application 301 indicating updating portions of the remote application copy of the host computer display bitmap 306. Due to the delay in detecting changes in the host computer display bitmap 308 by the host application 307, in addition to the delays in creating messages by the host application 307 to be transmitted to the remote application 301, in addition to the communication delays through the communication channel 322 between the host applications 307 and the remote application 301, in addition to the processing delay in receiving messages indicating changes in the host computer display bitmap by the remote application 301, the updating of the remote application copy of the host computer display bitmap 306 may not occur instantaneously in the eyes of a human user watching the remote application display window 205. However, for the most part, the host computer display bitmap 308 and the remote application copy of the host computer display bitmap 306 can practically be maintained in near synchronization at all times.

Whenever a change in the remote application copy of the host computer display bitmap 306 occurs that is within the moveable viewport rectangle (which corresponds to the portion of the host computer screen image which is being displayed within the remote application display window 205), the remote application 301 updates the remote computer display bitmap 302 (specifically the portion 303 of the remote computer display bitmap 302) so that the remote application display window 205 will accurately reproduce the portion of the host computer screen image that is being displayed within the remote application display window 205.

As can be ascertained by looking at either FIGS. 2 or 3, both the remote computer display 204 and the host computer display 209 may or may not be the same size in terms of pixel height and width. In FIGS. 2 and 3, the remote computer display 204 and host computer display 209 are drawn as the same size. However, it is possible that the remote computer 201 may have a significantly smaller display 204 than the host computer 202. For example, if the host computer 209 is a full blown personal computer having a large display, such as 1024 pixels width and 760 pixels height, while the remote computer has a smaller display, such as a 640 pixel width and 480 pixel height display, then it is impossible to reproduce the host computer display image on the remote computer display 204, because the remote computer display 204 is smaller in pixel dimensions than the host computer display 209. In other words, even if the remote application display window 205 is permitted to occupy the entire remote computer display 204, if the remote computer display 204 dimensions are smaller than the host computer display 209 dimensions, then the entire host computer display image cannot be reproduced on the remote computer display 204.

As is illustrated in FIGS. 2 and 3, the remote application display window 205 is significantly smaller than the remote computer display 204. This is frequently the case when the remote user wants to control the host computer 202 through the remote application display window 205, but also wants to run independent other applications 305 on the remote computer 201, and therefore needs to reserve a significant portion of the remote computer display 204 to the display windows of the other applications 305 or windows of the remote operating system 304. Thus, as illustrated in FIGS. 2 and 3, the remote application display window 205 is significantly smaller in both height pixel dimension and width pixel dimension as compared to the host computer display 209. In this case, it is not possible to show on the remote application display window 205 the entire host computer screen image shown on the host computer display 209.

Figure 4:
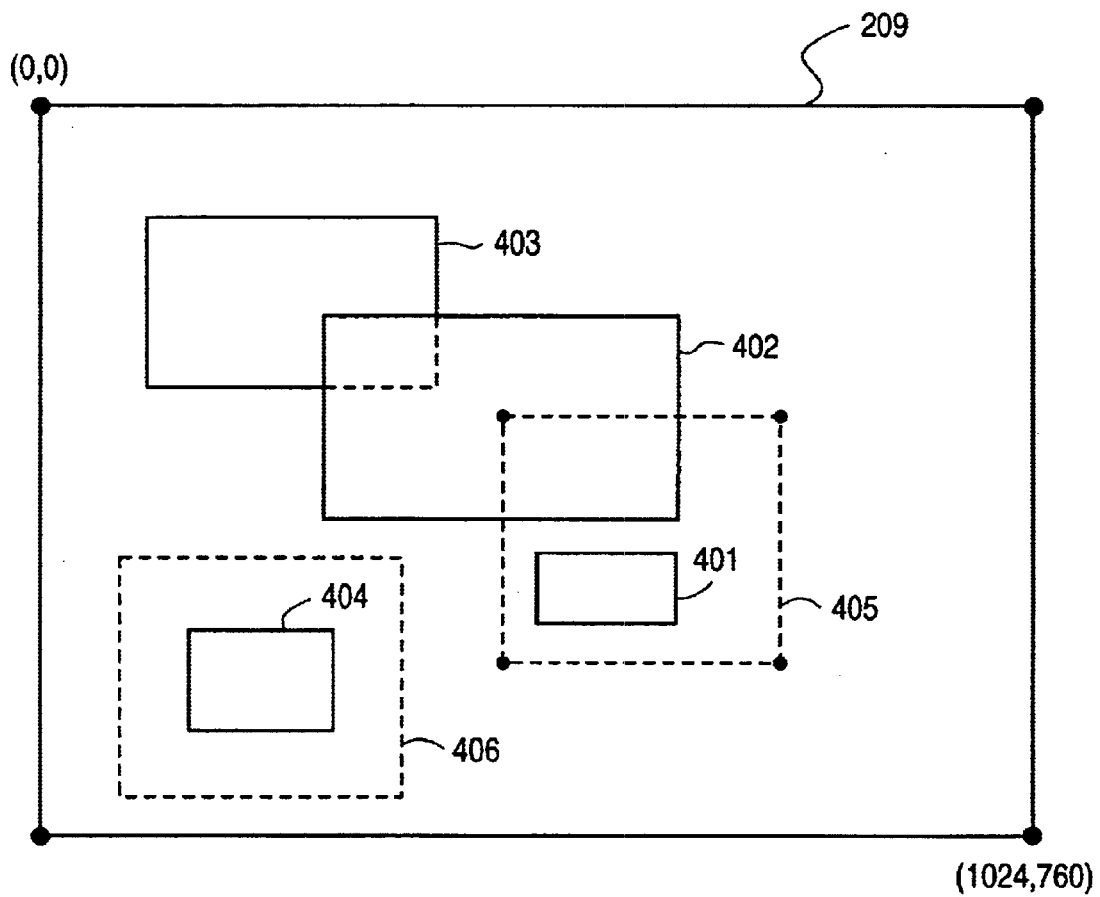
FIG. 4 illustrates the host computer display having four open windows and showing a rectangle corresponding to the position of a moveable viewport rectangle designating an area to be presented in the display window of the remote computer display.

FIG. 4 illustrates the host computer display having four open windows and showing a rectangle corresponding to the position of a movable viewport rectangle designating an area to be presented in the display window of the remote computer display. FIG. 4 depicts a rectangle 209 corresponding to the host computer display. The host computer display 209 has a pixel width of 1024 pixels, and a pixel height of 760 pixels. This is illustrated by the (X,Y) coordinates at the origin in the upper left-hand corner of the host computer display 209, shown as (0,0). In the lower right-hand corner of the host computer display 209, the coordinates of the lower right-hand corner is illustrated as (1024, 760).

FIG. 4 also illustrates four open windows 401, 402, 403, and 404 within the host computer display screen image. Dotted rectangle 405 corresponds to one possible position of the movable viewport rectangle maintained by the remote application 301. If the movable viewport rectangle 405 is logically in the position illustrated in FIG. 4, then the area enclosed by dotted rectangle 405 will be copied by the remote application 301 from the remote application copy of the host computer display bitmap 306 into the portion 303 of the remote computer display bitmap 302. In other words, although the entire host computer display bitmap 308 is duplicated in the remote application copy of the host computer display bitmap 306, only the portion of the remote application copy of the host computer display bitmap 306 which is contained within a movable viewport rectangle is copied into the portion 303 of the remote computer display bitmap 302 for display within the remote application display window 205.

The size of the movable viewport rectangle is governed by the size of the remote application display window. The size of the movable viewport rectangle is typically slightly less than the size of the remote application viewport window 205. The size of the remote application viewport rectangle 205 is typically set by the user in a normal drag and drop window sizing operation on the remote computer 201. However, because the remote application 301 itself has buttons and borders along the bottom sides and top of the remote application display window 205, the portion of the remote application display window 205 which can be dedicated to reproducing the host computer display screen image is slightly smaller than the remote application display window 205 itself.

It is generally desirable for the user of the remote computer 201 to be viewing the portion of the host computer screen image in which activity is occurring. For example, in the example shown in FIG. 4, there are four open windows 401, 402, 403, and 404. At time 1, perhaps window 401 is the active window for which activity is occurring on the host computer. In this event, having the movable viewport rectangle 405 in the position illustrated in FIG. 4 is desirable because the active window 401 would be displayed on the remote application display window 205 of the remote computer display 204. However, if the active window in the host computer display 209 were to change from window 401 to window 404, then the remote user viewing the portion of the host computer screen image within the movable viewport rectangle 405 would be confused by the fact that he is no longer observing the activity on the host computer display screen image. In other words, activity would be occurring in window 404, and yet this portion of the host computer display image would not be shown on the remote computer display window.

According to the present invention, whenever a new window becomes the foreground window on the host computer 202, then the movable viewport rectangle designating which portion of the remote application copy of the host computer display bitmap 306 is to be written into the portion 303 of the remote computer display bitmap 302 is moved so as to intersect the new active window within the host computer display screen image. As illustrated in FIG. 4, if the foreground window at time 1 is window 401, then movable viewport rectangle 405 is suitably positioned, because it encloses and therefore intersects the active window 401. However, if the host computer foreground window changes to window 404 at time 2, then according to the present invention it is necessary to move the movable viewport rectangle 405 to a new position which will intersect the new active window 404. As shown in FIG. 4, movable viewport rectangle 406 is suitably placed at time 2 since window 404 has become the active window on the host computer 202. If however at time 1 window 401 is the active window, and the active window is changed at time 2 to window 402, then the placement of movable viewport rectangle 405 is suitable because it intersects (although it does not completely enclose) window 402 according to the present invention.

It should be noted that FIG. 4 illustrates the host computer display 209 and certain elements within the host computer display screen image, such as windows 401, 402, 403, and 404, however movable viewport rectangles 405 and 406 are illustrated on FIG. 4 only for the purposes of illustrating the affect of their placement. In actuality, the movable viewport rectangle is maintained on the remote application 301. The movable viewport rectangle determines which portion of the remote application copy of the host computer display bitmap 306 is to be written into the portion 303 of the remote computer display bitmap 302. The content of the portion 303 of the remote computer display bitmap 302 determines what screen image appears within the remote application display window 205.

According to the present invention, in order to notify the remote application 301 of the existence of a positioning of a new foreground window on the host computer 202, the host application 307 sends the remote application 301 a new active window message through the link 323. The new active window message specifies a rectangle that is the position of the new active window. The active window rectangle contained within the new active window message transmitted through link 323 from the host application 307 to the remote application 301 typically is represented as an upper left-hand coordinate position and a lower right-hand coordinate position. Alternatively, the active window rectangle may be represented as a upper left-hand corner coordinate and a width and height, thereby allowing easy calculation of the lower right-hand corner and the other two corners as well.

The host application 307 receives notification of a new foreground window on the host computer 202 from the host operating system 309 through link 324. This new foreground window message received from the operating system 309 is then processed by the host application 307 and transmitted to the remote application 301 through link 323 as described above. FIG. 3 shows links 316, 322, and 323 as being separate links, however, they are all logical representations of the processes being carried out by the remote application 301 and host application 307. In actuality, links 316, 322 and 323 are all part of the communication link 203 illustrated in FIG. 2. In fact, the links 316, 322, and 323 may actually occur through the operating systems 304 and 309 rather than directly from host application 307 to a remote application 301 as illustrated in FIG. 3. Thus, FIG. 3 is a logical diagram showing the flow of messages from various software and hardware entities according to the present invention. It is to be understood that the messages being transmitted on links 322 and 323 from the host application 307 to the remote application 301 may actually be accomplished by any one of several well known methods involving calls to the operating system 309 or other utilities. Similarly, the remote application 301 may receive messages transmitted on links 322 and 323 through operating system 304. In addition, the messages 316 traveling from the remote application 301 to the host application 307 may actually be routed through the remote operating system 304 to the host operating system 309 and then down to the host application 307. Such communication described above between operating system 304 and 309 may actually involve several intermediate elements such as network interface 111 or modem 112 illustrated in FIG. 1.

Figure 5:
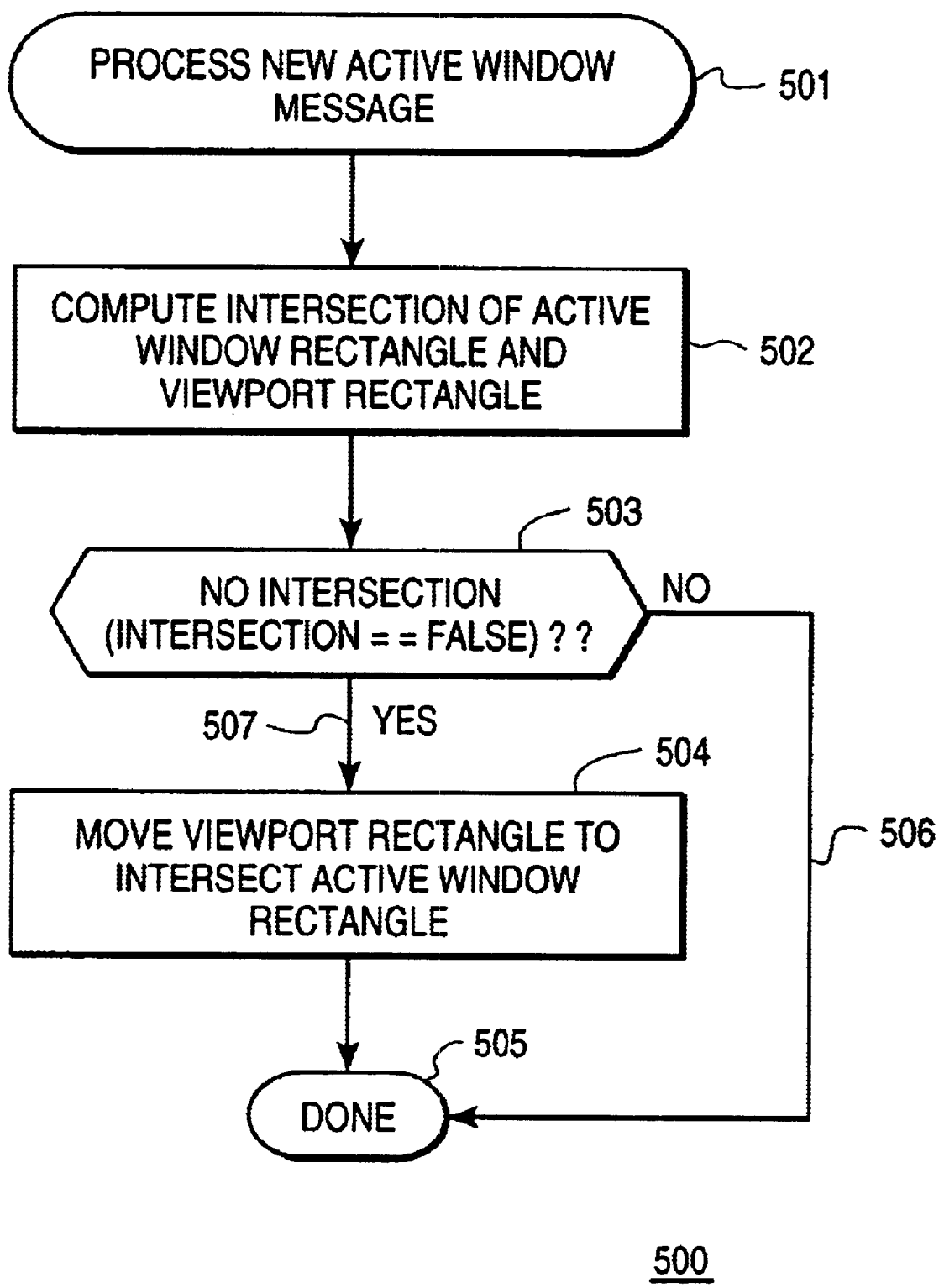
FIG. 5 illustrates a method by which the remote application on the remote computer processes a new active window message according to the present invention.

FIG. 5 illustrates a method by which a remote application on the remote computer processes a new active window message according to the present invention. Some time after a new active window message is transmitted from the host application 307 to the remote application 301, the new active window message is processed. This processing occurs in the most general sense as illustrated in FIG. 5 according to the present invention. The remote application 301 begins processing the new active window message at step 501. At step 502, the remote application 301 computes the intersection of the active window rectangle and viewport rectangle. Step 502 computes a logic variable having either a true or false output. For example, if the active window rectangle and movable viewport rectangle intersect at all, meaning they have at least one point in common, then the intersection is deemed true. If there is no intersection or overlap between the active window rectangle and movable viewport rectangle, then the intersection is deemed to be false. In practice, the operating system 304 on the remote computer 201 may include a utility or routine which is capable of performing the intersection computation for the remote application 301. In this case, the remote application 301 at step 502 calls the operating system utility having the capability of computing intersection with the two rectangles as arguments. However, there is no requirement according to the present invention that the remote application 301 rely on the operating system 304 to compute the intersection of the active window rectangle and the movable viewport rectangle.

Once the logic value of the intersection has been computed at step 502, then the method progresses to test 503 which checks the value of the intersection variable computed at step 502. If there is an intersection, then the intersection variable computed at step 502 is true, and branch 506 takes the method to completion at step 505. If however the intersection is false, meaning that there was no overlap between the active window rectangle and the movable viewport rectangle, then branch 507 takes the method to step 504. At step 504, the movable viewport rectangle is moved so as to intersect the active window rectangle according to the present invention.

Figure 6:
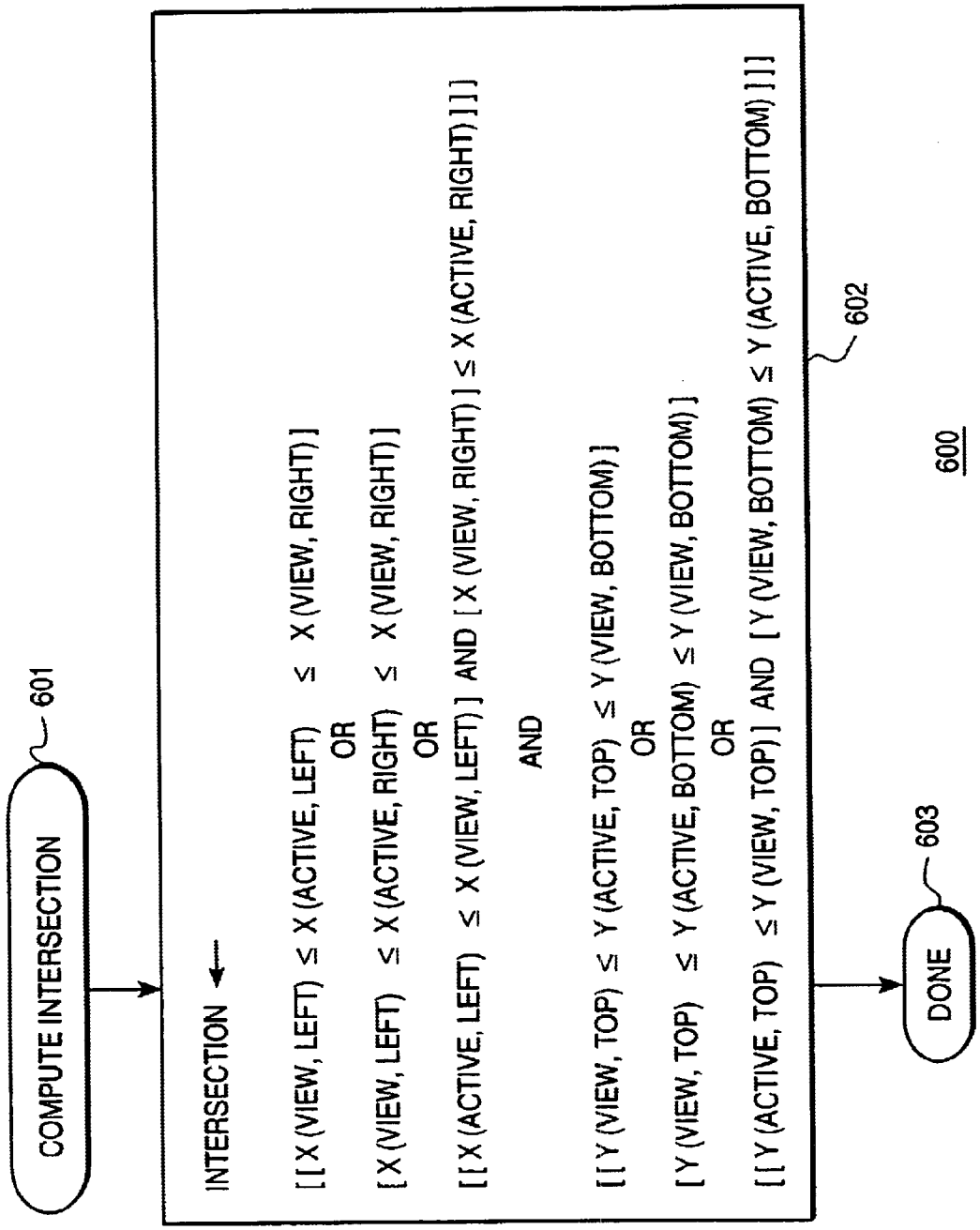
FIG. 6 illustrates a method for computing whether or not the active window rectangle intersects the current position of the moveable viewport rectangle according to the present invention.

FIG. 6 illustrates a method for computing whether or not the active window rectangle intersects the current position of the movable viewport rectangle according to the present invention. The method begins at step 601, corresponding to the beginning of step 502 in FIG. 5. At step 602, the intersection variable is computed. In FIG. 6, each edge is represented by an X or Y value. For example, the left edge of the movable viewport rectangle is represented by X(view, left). The top edge of the movable viewport rectangle is represented by the expression Y(view,top). Similarly, the right edge of the active window rectangle is represented by the expression Y(active,right). The bottom edge of the active window rectangle is represented by the expression Y(active, bottom).

The intersection variable is a logical function of the six inequality and logic lines having expressions such as discussed above with respect to the edges of the rectangle. The first line in step 602 determines if the active window rectangle left edge is between the left and right edges of the viewport rectangle. The second line in step 202 determines if the right edge of the active window rectangle is between the left and right edges of the movable viewport rectangle. The third line in step 602 indicates if the left edge of the active window is left of the viewport left edge, and the right edge of the active window is right of the viewport right edge. In any of those cases, there is intersection between the viewport rectangle and the active window rectangle with respect to the X dimension.

The lower three lines in step 602 determine whether or not there is intersection between the movable viewport rectangle and the active window rectangle with respect to the Y dimension. The fourth line in step 602 determines if the top edge of the active window rectangle is between the top and bottom edges of the movable viewport rectangle. The fifth line of the step 602 determines whether or not the bottom edge of the active window rectangle is between the top and bottom edges of the movable viewport rectangle. The sixth line of the step 602 determines whether or not the top edge of the movable viewport rectangle is above the top edge of the active window rectangle and the bottom edge of the active window rectangle is below the bottom edge of the movable viewport rectangle. Lines 4, 5, and 6 of step 602 therefore determine if there is overlap between the movable viewport rectangle and the active window rectangle with respect to the Y dimension.

Only if there is overlap in both the X dimension and the Y dimension of the active window rectangle and movable viewport rectangle is there an intersection between the active window rectangle and the movable viewport rectangle. Once this logic test has been performed and true or false value assigned to the intersection variable at step 602, then the process is done at step 603 and the method in FIG. 5 progresses to step 503. It is to be understood that the inequalities discussed and shown in step 602 are not necessarily the simplest computations which could be performed to determine the intersection of the active window rectangle on the movable viewport rectangle. These steps are merely exemplary and are not limiting to the present invention.

Figure 7:
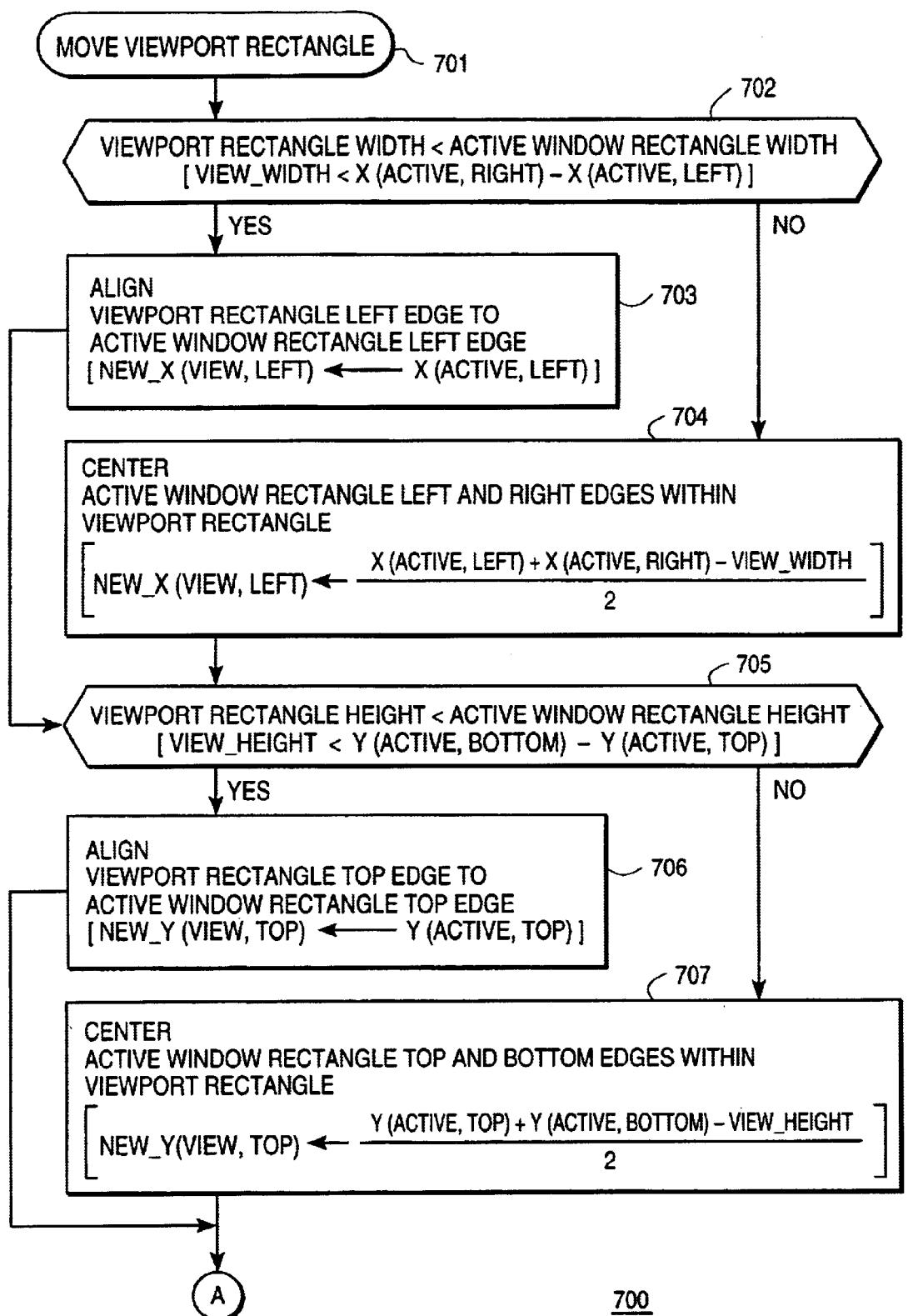
FIG. 7 illustrates a method by which the remote application on the remote computer calculates the new position of the moveable viewport rectangle so as to be to left-aligned or centered in the x-dimension and top-aligned or centered in the y-dimension with respect to the active window rectangle according to the preferred embodiment of the present invention.

FIG. 7 illustrates a method by which the remote application on the remote computer calculates the new position of the movable viewport rectangle so as to be left aligned or centered in the X dimension and top aligned or centered in the Y dimension with respect to the active window rectangle according to the preferred embodiment of the present invention. FIGS. 7, 8, 9 and 12, taken together describe the preferred embodiment for the method of carrying out step 504 shown in FIG. 5. In other words, FIGS. 7, 8, 9, and 12 describe the preferred embodiment of the way to move the viewport rectangle so as to intersect the active window rectangle.

The method starts at step 701 with the beginning of step 504 in FIG. 5. At test 702, the remote application 301 determines whether or not the viewport rectangle width is less than the active rectangle width. If the viewport rectangle width is less than the active window rectangle width, then it is impossible to show the entire active window rectangle X dimension within the viewport rectangle of the remote application display window 205. Therefore, if the answer to test 702 is yes, in the preferred embodiment the remote application aligns the viewport rectangle with the left edge of the active window rectangle left edge. This permits the right edge of the active window rectangle to not be shown within the remote application display window 205. If however the viewport rectangle width is not less than the active window rectangle width, then it is possible to show the entire active window rectangle X dimension within the remote application display window 205. Thus, if the answer to step 702 is no in the preferred embodiment, the remote application at step 704 centers the active window rectangle left and right edges within the viewport rectangle. Such centering is shown for example in FIG. 4 with the logical position of viewport rectangle 406 and active window rectangle 404. The active window rectangle 404 is centered in the X dimension and in the Y dimension within the movable viewport rectangle 406. Test 702 determines which of steps 703 and 704 to perform. Either step 703 left aligns the viewport rectangle with the active window rectangle left edge or step 704 centers the active window rectangle left and right edges within the viewport rectangle. In either event the method then reverts to test 705 which determines whether or not the viewport rectangle height is less than the active window rectangle height.

If the viewport rectangle height is less than the active window rectangle height, then it is impossible to display the entire active window rectangle image on the remote application display window 205. Therefore, in that event, step 706 aligns the viewport rectangle top edge to the active window rectangle top edge, thereby allowing the active window rectangle bottom edge to not be displayed within the remote application display window 205. If however the viewport rectangle height is not less than the active window rectangle height, then the entire active window rectangle Y dimension can be successfully displayed within the remote application display window 205. In that event then step 707 centers the active window rectangle top and bottom edges within the viewport rectangle. In summary, the method of FIG. 7 either left aligns or centers in the X dimension the active window rectangle and the viewport rectangle, and either top aligns or centers in the Y dimension the active window rectangle and the viewport rectangle.

Figure 8:
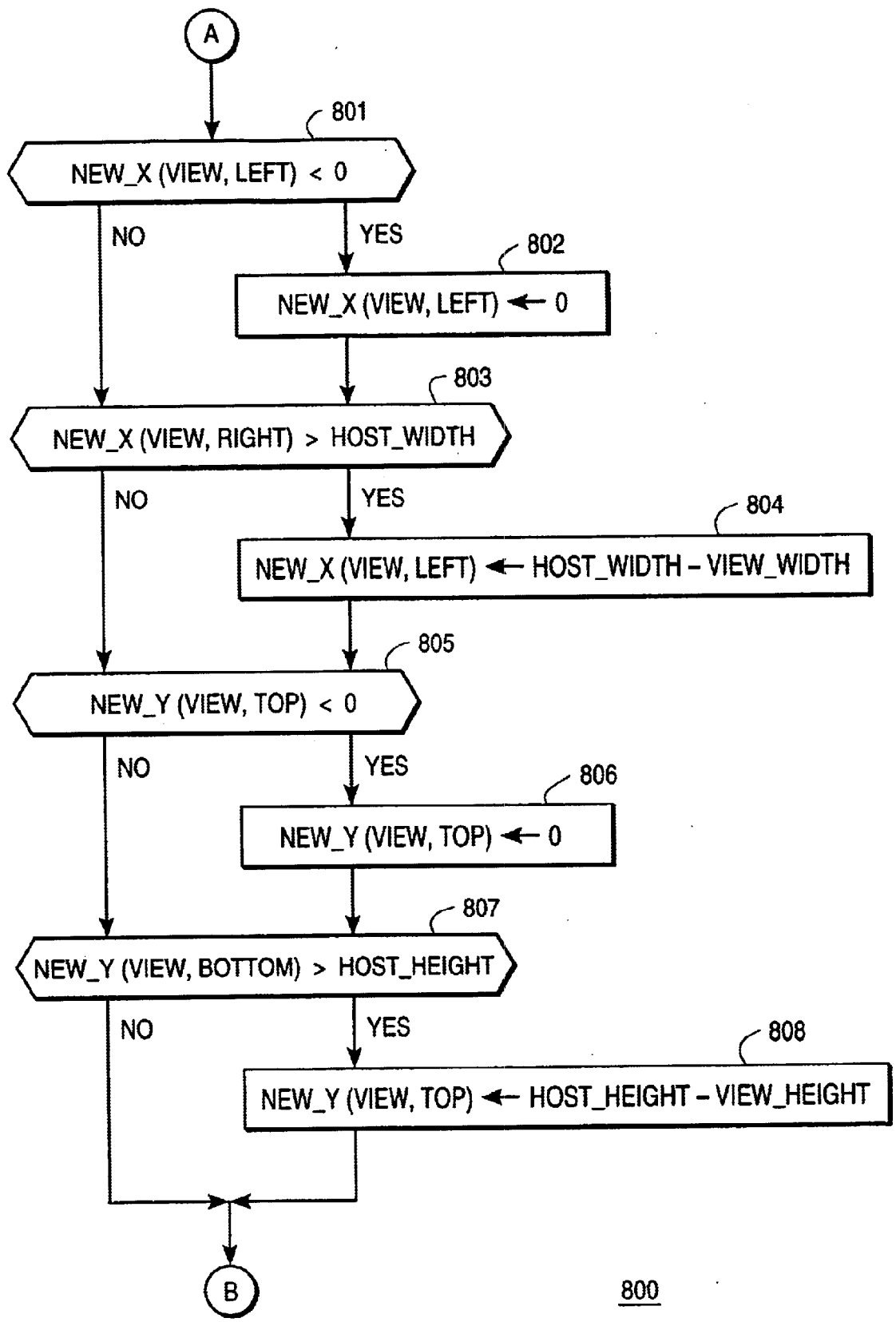
FIG. 8 illustrates a method by which the remote application on the remote computer calculates the new position of the moveable viewport rectangle so as to be left or right aligned to the left or right edge, respectively, of the host display screen image and/or to be top or bottom aligned to the top or bottom edge, respectively, of the host display screen image if the centering steps illustrated in FIG. 7 would otherwise cause the moveable viewport rectangle to intersect any areas outside the host display area according to the preferred embodiment of the present invention.

It is possible if step 704 and step 707 were performed that the new calculated position of the movable viewport rectangle may cover areas outside of the host computer display dimensions. For example, if the active window on the host computer is very small and is very near a corner of the host computer display and if the movable viewport rectangle is significantly larger than the active window rectangle, then the centering operations in steps 704 and 707 may result in the viewport rectangle edges falling outside of the host computer display edges, thereby attempting to display in the remote application display window 205 host computer display screen image regions which are not defined. Because it is generally undesirable to display blank regions outside of the dimensions of the host computer display, FIG. 8 illustrates a method according to the preferred embodiment of the present invention whereby it is ensured that the remote application display window 205 never displays regions outside of the host computer display outer boundaries. For example, step 801 determines whether or not the left edge of the viewport rectangle is left of the left edge of the host computer display. If the left edge of the viewport rectangle is left of the host computer display left edge, then step 802 sets and thereby aligns the left edge of the viewport rectangle to the left edge of the host computer display. Step 803 determines whether or not the right edge of the viewport rectangle is right of the host computer display right edge. If the right edge of the viewport rectangle is right of the host computer display right edge, then step 804 aligns the right edge of the viewport rectangle with the right edge of the host computer display.

Steps 805 through 808 perform a similar adjustment to the top and bottom edges of the viewport rectangle. Specifically, step 805 determines if the viewport top edge is above the top edge of the host computer display. If the top edge of the viewport rectangle is above the top edge of the host computer display, then step 806 sets the top edge of the viewport rectangle to be aligned with the top edge of the host computer display. Step 807 determines if the bottom edge of the viewport rectangle is below the bottom edge of the host computer display. If the bottom edge of the viewport rectangle is below the host computer display, then the step 808 aligns the bottom edge of the viewport rectangle with the bottom edge of the host computer display. After steps 801 through 808 have been performed, the new position of the movable viewport rectangle will intercept the host computer display at all points within the movable viewport rectangle. In other words, the movable viewport rectangle will never include any points outside the host computer display. Although this feature is not required according to the present invention, it is included in the preferred embodiment of the present invention because it is assumed that the user will not want to view blank space within the remote application display window 205 on the remote computer 201.

The methods shown in FIGS. 7 and 8 have demonstrated how the remote application 301 computes the new position of the movable viewport rectangle. The methods illustrated in FIGS. 7 and 8 have not actually moved the movable viewport rectangle or changed the display through the remote application display window 205, but they have calculated the new position of the moveable viewport rectangle which will affect the screen image of the remote application display window 205 after movement is made. The actual movement of the moveable viewport rectangle is described below.

Figure 9:
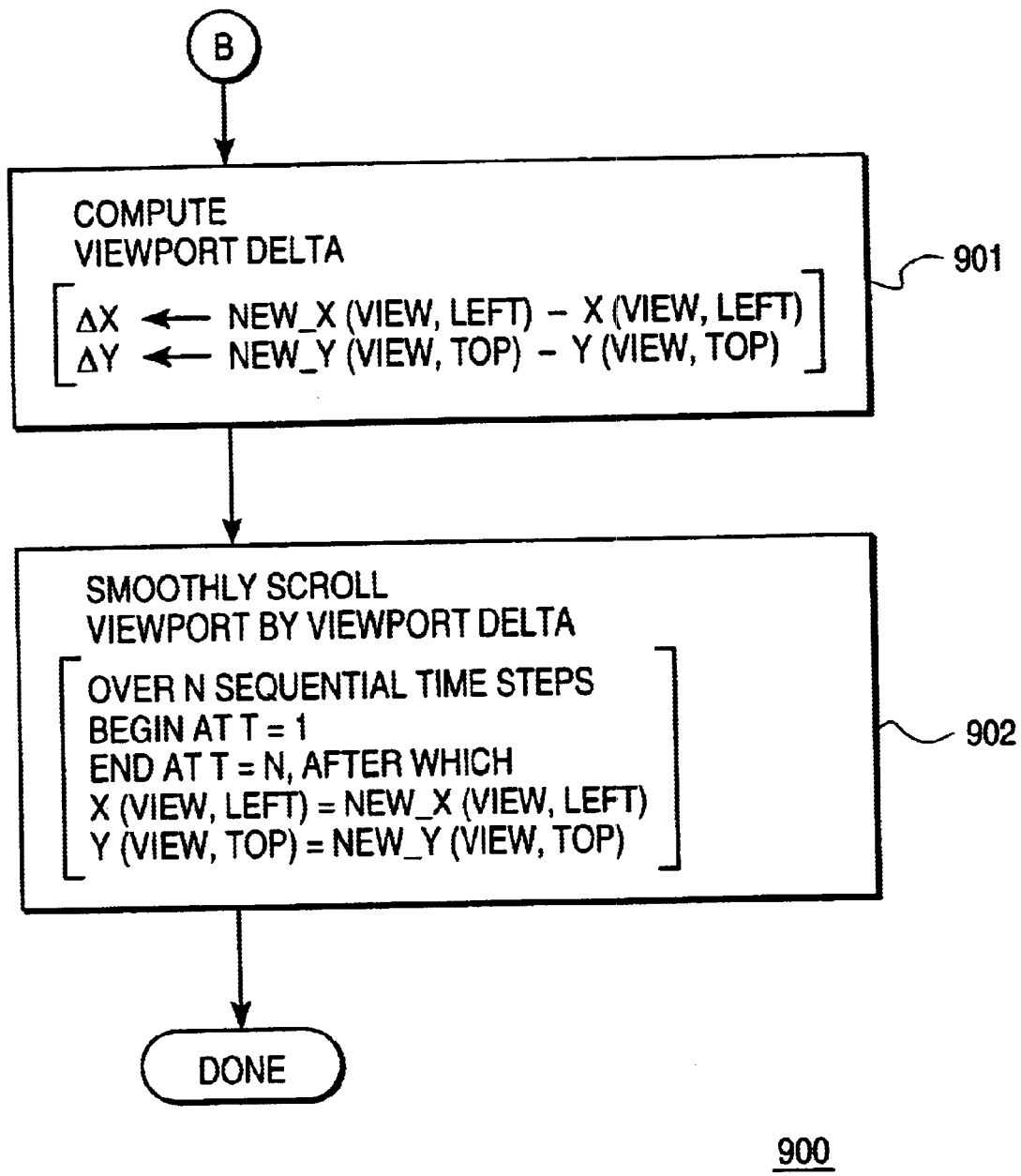
FIG. 9 illustrates a method by which the remote application on the remote computer calculates a viewport delta and scrolls the moveable viewport rectangle by the viewport delta over N sequential time steps according to the present invention.

FIG. 9 illustrates the movement of the movable viewport rectangle to its new position which was calculated in the methods shown in FIGS. 7 and 8. At step 901, a viewport delta is computed for both the X dimension and Y dimension movement. The viewport delta represents a two-dimensional vector describing how much the movable viewport rectangle must be moved from its current position, thereby to be placed in its new position which was calculated in the methods of FIGS. 7 and 8.

Figure 10:
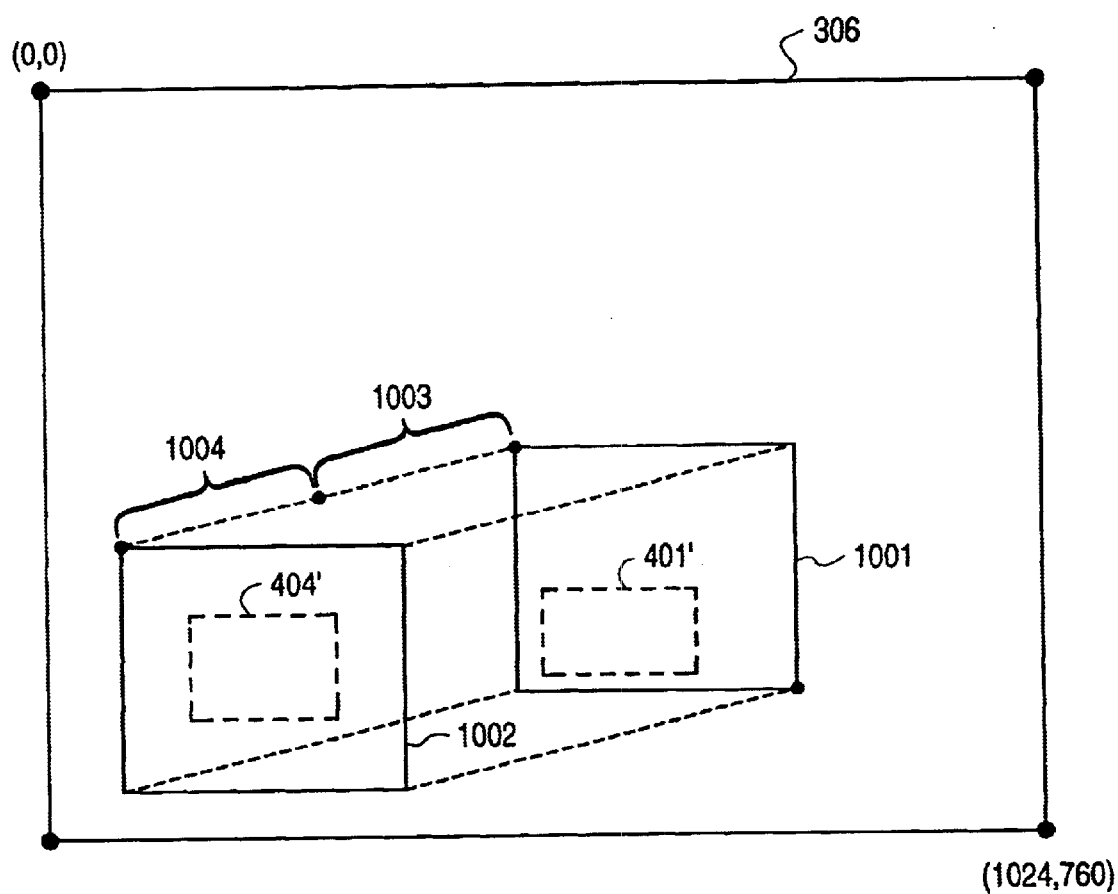
FIG. 10 illustrates in graphical form the remote application copy of the host computer display bitmap and the moveable viewport rectangle in its initial and final positions and its scroll path during a scroll in response to a change in the active window according to the present invention.

At step 902, the movable viewport rectangle is smoothly scrolled from its old position to its new position over a time period which is not insignificant to a remote user watching the movement. In other words, the movable viewport rectangle is scrolled to its new position in a manner similar to how a user himself might have manually scrolled over to a new position on the screen. (Actually, the smooth scroll involves movement in the horizontal and vertical directions simultaneously, which is impossible in a single mouse system using thumbwheels along the bottom and sides as is typical in many applications.) It is to be noted that there is no requirement according to the present invention that the movable viewport rectangle be scrolled to its new position according to the present invention. For example, the movable viewport rectangle may simply be instantaneously changed from its old position to its new position. Alternatively, the movable viewport rectangle may be moved at a constant velocity from its old position to its new position in a not insignificant time when viewed by the user. There is no requirement according to the present invention as to how the movable viewport rectangle is moved from its current position to its new position. However, in the preferred embodiment of the present invention, the movable viewport rectangle is smoothly scrolled from its old position to its new position. FIG. 10 illustrates how this smooth scrolling might appear in the context of the example shown in FIG. 4.

FIG. 10 illustrates the remote application copy of the host computer display bitmap 306. The movable viewport rectangle 101 encloses an area 401' which represents the position of the active window 401 at time 0. An active window message is processed by the remote application which indicates that the new active window rectangle is at the position illustrated by dotted rectangle 404' in FIG. 10. Because active window rectangle 404' is smaller in both the X dimensions and the Y dimensions from the movable viewport rectangle 1001 and 1002, steps 704 and 707 in FIG. 7 perform a centering operation thereby calculating a new position 1002 for the movable viewport rectangle such that the active window rectangle 404' is centered within the movable viewport rectangle 1002. Once the new position 1002 has been calculated, the remote application smoothly scrolls the movable viewport rectangle from its current position 1001 to its new position 1002.

During the first half 1003 of this movement, the velocity of the scrolling increases linearly in the preferred embodiment of the present invention. During the second half 1004 of this movement the scroll velocity of the movable viewport rectangle decreases linearly until the movable viewport rectangle 1002 reaches its new position 1002.

FIG. 10 illustrates logically the movement of the movable viewport rectangle 1001 to its new position 1002. However, it is to be understood that the position of the remote application display window 205 does not change during the movement of the movable viewport rectangle. As the movable viewport rectangle is scrolled over to its new position a different portion of the remote application copy of the host computer display bitmap 306 is continuously written through link 325 from the remote application into the portion 303 of the remote computer display bitmap 302. The portion 303 includes at all times during the scroll operation the portion of the remote application copy of the host computer display bitmap 306 which is contained within the movable viewport rectangle as it is scrolled from its old position 1001 to its new position 1002. Therefore, the appearance within the remote application display window 205 is that of a stationary window looking into a host computer display which is moving relative to the fixed window 205.

Figure 11:
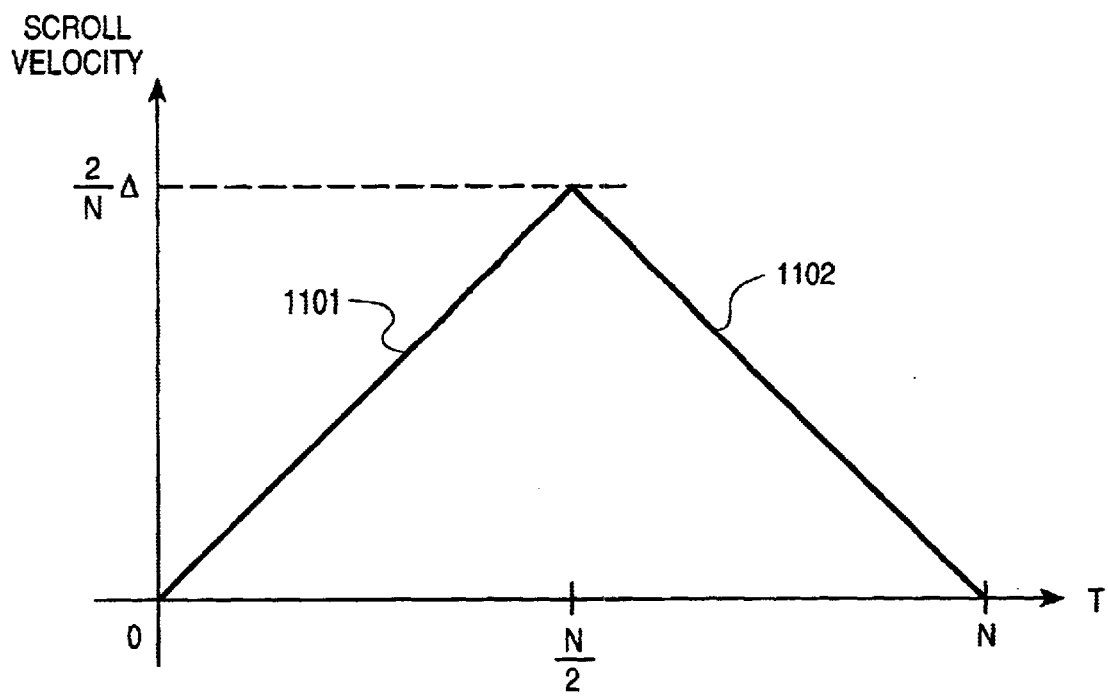
FIG. 11 illustrates the scroll velocity over time during a smooth scroll operation on the moveable viewport rectangle in the preferred embodiment of the present invention.

FIG. 11 shows the scroll velocity versus time during the smooth scroll operation according to the preferred embodiment of the present invention. If the smooth scroll operation is performed over N time steps, then the peak velocity occurs at time step N/2, and the peak velocity equals $2\Delta/N$, where $\Delta$ represents the delta in one dimension. After N time steps, the movable viewport rectangle will have been moved by the intended delta amount. During the accelerating portion 1101 of the scroll, which corresponds to movement 1003 shown in FIG. 10, the movable viewport rectangle is accelerating along its scroll path. During the deceleration portion 1102 of the scroll, corresponding to section 1004 illustrated in FIG. 10, the movable viewport rectangle is decelerating to its final position 1002. This smooth scroll operation provides a smooth and pleasant appearance to the remote user.

Figure 12:
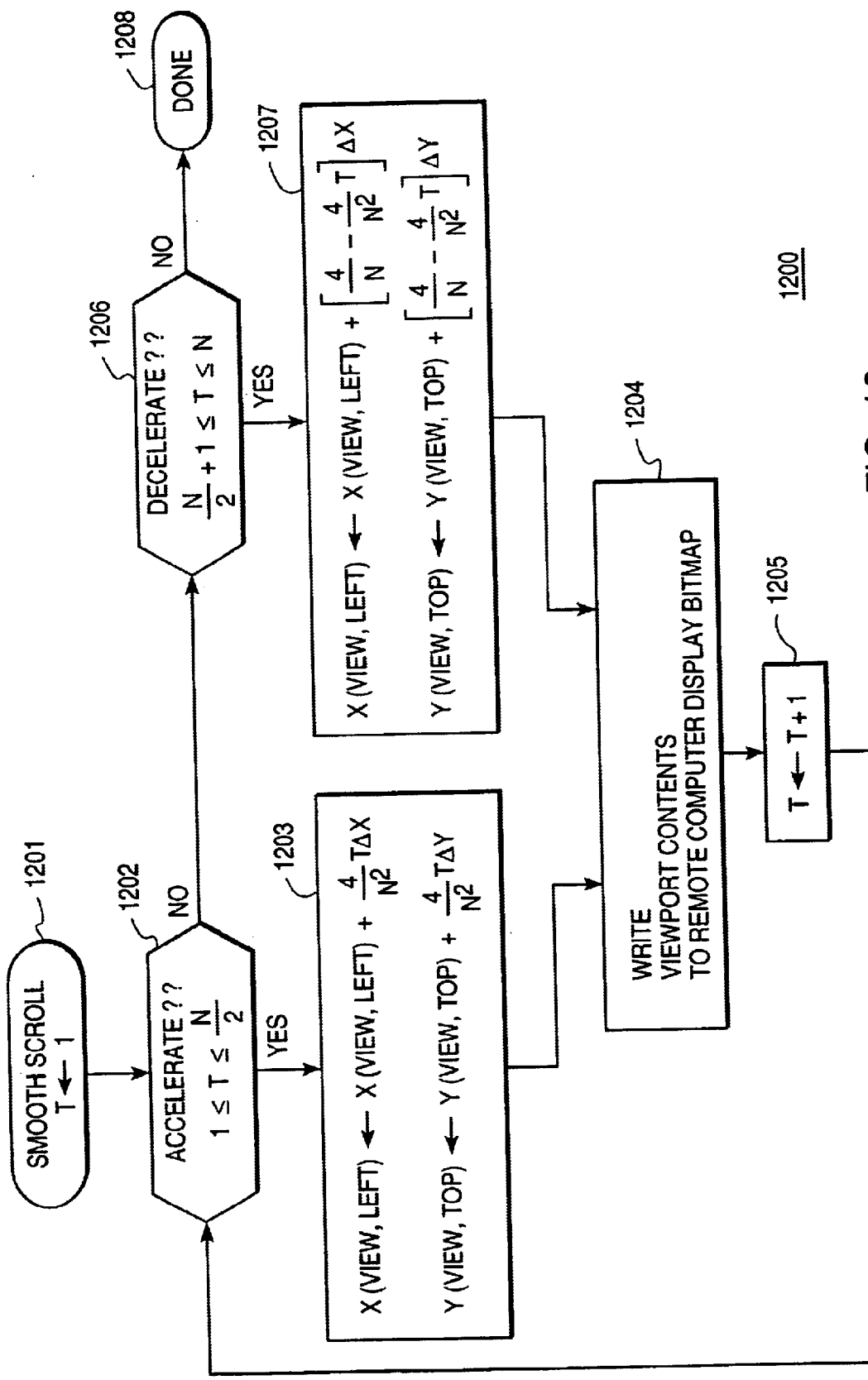
FIG. 12 illustrates a method by which the remote application on the remote computer performs a smooth scroll operation on the moveable viewport rectangle according to the preferred embodiment of the present invention.

FIG. 12 illustrates a method by which the remote application and the remote computer performs a smooth scroll operation on the movable viewport rectangle according to the preferred embodiment of the present invention. The smooth scroll operation begins at step 1201 which occurs during the beginning of step 902. The smooth scroll begins at step 1201, and the time is set to 1. At step 1202, the method determines whether or not it is accelerating the scroll. If the time is during the first half of the smooth scroll operation, then step 1202 directs the method to step 1203. At step 1203, the position of the movable viewport rectangle is changed incrementally by changing the position of the horizontal and vertical edges of the movable viewport rectangle. At step 1204, the movable viewport rectangle contents are written to the portion 303 of the remote computer display bitmap 302. At step 1205, the method proceeds to the next step of the smooth scroll operation.

For the first N/2 steps of the smooth scroll operation, the method iterates through steps 1202, 1203, 1204, and 1205. During each successive pass through step 1203 the position of the movable viewport rectangle is moved by slightly more each time in correspondence with the fact that the overall movement is accelerating during the first half of the smooth scroll operation. After the N/2 step, the result of test 1202 is false and the smooth scroll operation begins to decelerate. At step 1206 the method checks to see whether or not the smooth scroll operation is finished entirely or not. If not, at step 1207, the movable viewport rectangle edges are moved again. At step 1204 the viewport contents are written to the portion 303 of the remote computer display bitmap 302. At step 1205, the time is incremented and during the deceleration portion of the smooth scroll the method iterates through steps 1206, 1207, 1204, and 1205 until the smooth scroll is completed, at which time test 1206 results in a "no" answer and the method is done at step 1208. During each successive loop through the deceleration portion of the smooth scroll, at step 1207 the movable viewport rectangle is moved by slightly less each time in correspondence with the fact that the scroll is decelerating.

Figure 13:
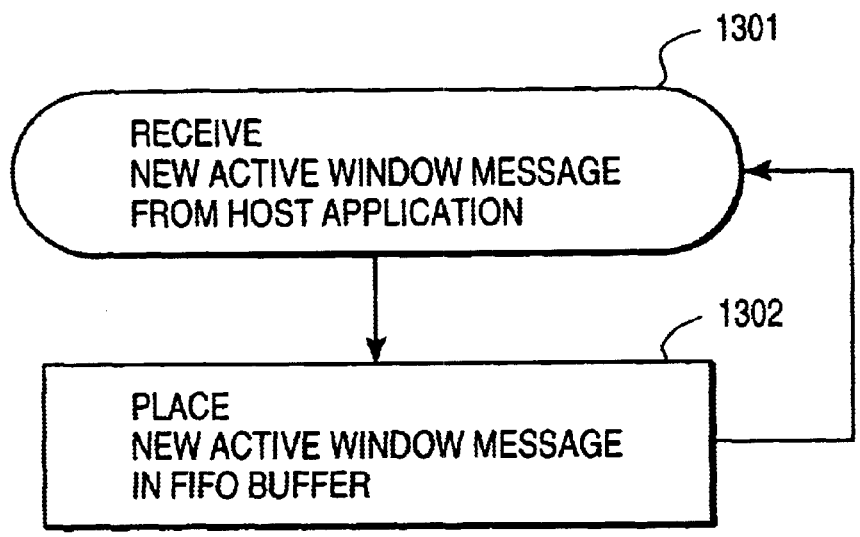
FIG. 13 illustrates a method by which the remote application on the remote computer stores an incoming new active window message from the host application in a first-in-first-out buffer according to a preferred embodiment of the present invention.

FIG. 13 illustrates a method by which the remote application on the remote computer stores an incoming new active window message from the host application in a first-in-first-out buffer according to a preferred embodiment of the present invention. Because the smooth scroll operation described above takes a not insignificant real time to be accomplished, and indeed this user observable smooth and slow scrolling is actually desired, it is possible for several new active window messages to be generated by the host application and transmitted to the remote application before a single new active window message can be processed. In other words, during the smooth scroll operation resulting from one new active window message, one or more additional new window messages may come into the remote application.

Thus, in the preferred embodiment of the present invention, when a new active window message is received from the host application 307, the remote application 301 places the new active window message in a first-in first-out buffer at step 1302. Each new active window message received from the host application at step 1301 results in the placement of that new active new window message in the first-in first-out buffer at step 1302.

Figure 14:
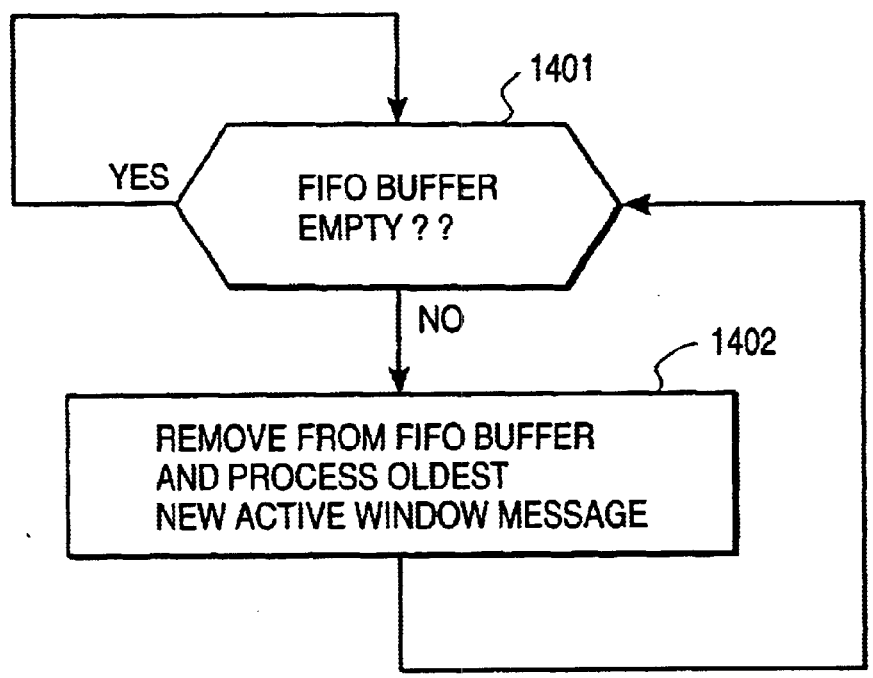
FIG. 14 illustrates a method by which the remote application on the remote computer removes and processes a new active window message from the first-in-first-out buffer according to the preferred embodiment of the present invention.

FIG. 14 illustrates a method by which the remote application on the remote computer removes and processes a new active window message from the first-in first-out buffer according to the preferred embodiment of the present invention. If the first-in first-out buffer is not empty, step 1401 carries the method to step 1402 where the oldest new active window message in the first-in first-out buffer is removed and processed according to the method illustrated in FIG. 5.

Figure 15:
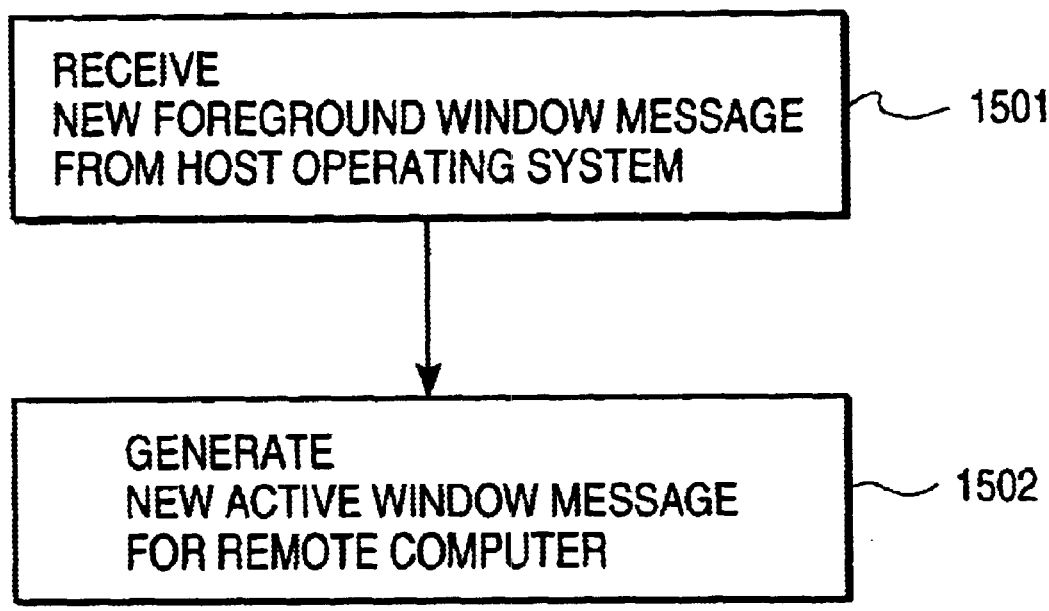
FIG. 15 illustrates a method by which the host application on the host computer receives a new foreground window message from the host operating system and generates a new active window message to be sent to the remote application on the remote computer according to the preferred embodiment of the present invention.

FIG. 15 illustrates a method by which the host application on the host computer receives a new foreground window message from the host operating system and generates a new active window message to be sent to the remote application on the remote computer according to the preferred embodiment of the present invention. The host operating system typically sends foreground window messages to all the applications running under it on the host machine. At step 1501, when the host application receives a new foreground window message from the host operating system, then the host application generates a new active window message for the remote computer at step 1502. This process of generating the new active window message involves creating a rectangle which defines the new active window and packaging it in a format which is suitable for the remote application.

Although the present invention has been described in its presently preferred embodiment, that embodiment is offered by way of example, not by way of limitation. It is to be understood that various additions and modifications can be made without departed from the spirit and scope of the present invention. Accordingly, all such additions and modifications are deemed to lie with the spirit and scope of the present invention as set out in the appended claims.

What is claimed is:

1. A method for presenting in a display window of a remote computer a portion of a host computer display screen image, the portion being defined by a moveable viewport rectangle, the method comprising the steps of:

generating within said remote computer a copy of said host computer display screen image;

receiving from said host computer a new active window message specifying an active window rectangle, wherein said new active window message corresponds to a portion of said copy of said host computer display screen image;

determining whether the moveable viewport rectangle intersects the active window rectangle; and if the determining step determines that the moveable viewport rectangle does not intersect the active window rectangle, moving the moveable viewport rectangle to intersect the active window rectangle.

2. A method as in claim 1, wherein the step of moving the moveable viewport rectangle to intersect the active window rectangle comprises the steps of:

aligning a moveable viewport rectangle new left edge to an active window rectangle left edge; and aligning a moveable viewport rectangle new top edge to an active window rectangle top edge.

3. A method as in claim 1, wherein the step of moving the moveable viewport rectangle to intersect the active window rectangle comprises the steps of:

computing a viewport delta for the moveable viewport rectangle representing a difference of a moveable viewport rectangle new position from a moveable viewport rectangle current position; and smoothly scrolling the moveable viewport rectangle by the viewport delta.

4. A method as in claim 3, wherein the step of smoothly scrolling comprises the steps of:

accelerating movement of the moveable viewport rectangle during scrolling along a first half of the viewport delta; and decelerating movement of the moveable viewport rectangle during scrolling along a second half of the viewport delta.

5. A method as in claim 1, wherein the step of receiving the new active window message further comprises the steps of:

placing the new active window message in a first-in-first-out buffer; and removing the new active window message from the first-in-first-out buffer.

6. A method for presenting in a display window a portion of a computer display screen image, the portion being defined by a moveable viewport rectangle, the method comprising the steps of:

receiving a new active window message specifying an active window rectangle;

determining whether the moveable viewport rectangle intersects the active window rectangle; and if the determining step determines that the moveable viewport rectangle does not intersect the active window rectangle, moving the moveable viewport rectangle to intersect the active window rectangle, wherein the step of moving the moveable viewport rectangle to intersect the active window rectangle comprises the steps of:

if a moveable viewport rectangle width is less than an active window rectangle width, aligning a moveable viewport rectangle new left edge to an active window rectangle left edge;

if a moveable viewport rectangle height is less than an active window rectangle height, aligning a moveable viewport rectangle new top edge to an active window rectangle top edge;

if the moveable viewport rectangle width is not less than an active window rectangle width, horizontally positioning the moveable viewport rectangle new left edge such that the active window rectangle will be horizontally centered within the moveable viewport rectangle; and if the moveable viewport rectangle height is not less than an active window rectangle height, vertically positioning the moveable viewport rectangle new top edge such that the active window rectangle will be vertically centered within the moveable viewport rectangle.

7. A method as in claim 6, wherein the step of moving the moveable viewport rectangle to intersect the active window rectangle further comprises the steps of:

if the moveable viewport rectangle new left edge is left of a computer display left edge, aligning the moveable viewport rectangle new left edge to the computer display left edge;

if a moveable viewport rectangle new right edge is left of a computer display right edge, aligning the moveable viewport rectangle new right edge to the computer display right edge;

if the moveable viewport rectangle new top edge is above a computer display top edge, aligning the moveable viewport rectangle new top edge to the computer display top edge; and if a moveable viewport rectangle new bottom edge is below a computer display bottom edge, aligning the moveable viewport rectangle new bottom edge to the computer display bottom edge.

8. A computer readable storage medium comprising:

computer readable program code embodied on said computer readable storage medium, said computer readable program code for programming a computer to perform a method for presenting in a display window of a remote computer a portion of a host computer display screen image, the portion being defined by a moveable viewport rectangle, the method comprising the steps of:
  generating within said remote computer a copy of said host computer display screen image;
  receiving from said host computer a new active window message specifying an active window rectangle, wherein said new active window message corresponds to a portion of said copy of said host computer display screen image;
  determining whether the moveable viewport rectangle intersects the active window rectangle; and
  if the determining step determines that the moveable viewport rectangle does not intersect the active window rectangle, moving the moveable viewport rectangle to intersect the active window rectangle.

9. A computer readable storage medium as in claim 8, wherein the step of moving the moveable viewport rectangle to intersect the active window rectangle comprises the steps of:
  aligning a moveable viewport rectangle new left edge to an active window rectangle left edge; and
  aligning a moveable viewport rectangle new top edge to an active window rectangle top edge.

10. A computer readable storage medium as in claim 8, wherein the step of moving the moveable viewport rectangle to intersect the active window rectangle comprises the steps of:
  computing a viewport delta for the moveable viewport rectangle representing a difference of a moveable viewport rectangle new position from a moveable viewport rectangle current position; and
  smoothly scrolling the moveable viewport rectangle by the viewport delta.

11. A computer readable storage medium as in claim 10, wherein the step of smoothly scrolling comprises the steps of:
  accelerating movement of the moveable viewport rectangle during scrolling along a first half of the viewport delta; and
  decelerating movement of the moveable viewport rectangle during scrolling along a second half of the viewport delta.

12. A computer readable storage medium as in claim 8, wherein the step of receiving the new active window message further comprises the steps of:
  placing the new active window message in a first-in-first-out buffer; and
  removing the new active window message from the first-in-first-out buffer.

13. A computer readable storage medium comprising:

computer readable program code embodied on said computer readable storage medium, said computer readable program code for programming a computer to perform a method for presenting in a display window a portion of a computer display screen image, the portion being defined by a moveable viewport rectangle, the method comprising the steps of:
  receiving a new active window message specifying an active window rectangle;
  determining whether the moveable viewport rectangle intersects the active window rectangle; and
  if the determining step determines that the moveable viewport rectangle does not intersect the active window rectangle, moving the moveable viewport rectangle to intersect the active window rectangle, wherein the step of moving the moveable viewport rectangle to intersect the active window rectangle comprises the steps of:
    if a moveable viewport rectangle width is less than an active window rectangle width, aligning a moveable viewport rectangle new left edge to an active window rectangle left edge;
    if a moveable viewport rectangle height is less than an active window rectangle height, aligning a moveable viewport rectangle new top edge to an active window rectangle top edge;
    if the moveable viewport rectangle width is not less than an active window rectangle width, horizontally positioning the moveable viewport rectangle new left edge such that the active window rectangle will be horizontally centered within the moveable viewport rectangle; and
    if the moveable viewport rectangle height is not less than an active window rectangle height, vertically positioning the moveable viewport rectangle new top edge such that the active window rectangle will be vertically centered within the moveable viewport rectangle.

14. A computer readable storage medium as in claim 13, wherein the step of moving the moveable viewport rectangle to intersect the active window rectangle further comprises the steps of:
  if the moveable viewport rectangle new left edge is left of a computer display left edge, aligning the moveable viewport rectangle new left edge to the computer display left edge;
  if a moveable viewport rectangle new right edge is left of a computer display right edge, aligning the moveable viewport rectangle new right edge to the computer display right edge;
  if the moveable viewport rectangle new top edge is above a computer display top edge, aligning the moveable viewport rectangle new top edge to the computer display top edge; and
  if a moveable viewport rectangle new bottom edge is below a computer display bottom edge, aligning the moveable viewport rectangle new bottom edge to the computer display bottom edge.

15. A remote computer system comprising:
  a remote computer display for displaying a remote computer screen image;
  a remote computer display bitmap, coupled to the remote computer display, for storing a digital representation of the remote computer screen image; and a remote application, coupled to the remote computer display bitmap, for writing a portion of the remote computer display bitmap corresponding to a display window, the remote application including:

a copy of a host computer display bitmap for storing a digital representation of a host computer screen image; and a remote new active window message handling means coupled to the copy of the host computer display bitmap for receiving a new active window message specifying an active window rectangle, for moving a moveable viewport rectangle so as to intersect the active window rectangle, and for writing the portion of the remote computer display bitmap corresponding to the display window with a portion of the copy of the host computer display bitmap corresponding to the moveable viewport rectangle, wherein the remote new active window message handling means is operable to:

if a moveable viewport rectangle width is less than an active window rectangle width, aligning a moveable viewport rectangle new left edge to an active window rectangle left edge;

if a moveable viewport rectangle height is less than an active window rectangle height, aligning a moveable viewport rectangle new top edge to an active window rectangle top edge;

if the moveable viewport rectangle width is not less than an active window rectangle width, horizontally positioning the moveable viewport rectangle new left edge such that the active window rectangle will be horizontally centered within the moveable viewport rectangle;

if the moveable viewport rectangle height is not less than an active window rectangle height, vertically positioning the moveable viewport rectangle new top edge such that the active window rectangle will be vertically centered within the moveable viewport rectangle;

if the moveable viewport rectangle new left edge is left of a computer display left edge, aligning the moveable viewport rectangle new left edge to the computer display left edge;

if a moveable viewport rectangle new right edge is left of a computer display right edge, aligning the moveable viewport rectangle new right edge to the computer display right edge;

if the moveable viewport rectangle new top edge is above a computer display top edge, aligning the moveable viewport rectangle new top edge to the computer display top edge; and if a moveable viewport rectangle new bottom edge is below a computer display bottom edge, aligning the moveable viewport rectangle new bottom edge to the computer display bottom edge.

* * * * *

UNITED STATES PATENT AND TRADEMARK OFFICE
CERTIFICATE OF CORRECTION

| | | |
|---|---|---|
| PATENT NO. | : 6,710,790 B1 | Page 1 of 1 |
| APPLICATION NO. | : 09/134076 | |
| DATED | : March 23, 2004 | |
| INVENTOR(S) | : James O. Fagioli | |

It is certified that error appears in the above-identified patent and that said Letters Patent is hereby corrected as shown below:

Title Page, Item 54, and Col. 1, Line 1, replace "APPARATUS" with --APPARATUSES--;
In Column 19, Line 1, Claim 7, replace "new right edge is left" with --new right edge is right--;
In Column 20, Line 50, Claim 14, replace "new right edge is left" with --new right edge is right--;
In Column 22, Lines 15-16, Claim 15, replace "new right edge is left" with --new right edge is right--;

Signed and Sealed this

Eighteenth Day of November, 2008

JON W. DUDAS
*Director of the United States Patent and Trademark Office*